United States Patent [19]

Cornils et al.

[11] Patent Number: 5,421,940
[45] Date of Patent: Jun. 6, 1995

[54] PROCESS FOR THE PRODUCTION OF AN AUTOMOBILE PANE EQUIPPED WITH AN ELASTOMER FRAME OF A PREDETERMINED SHAPE

[75] Inventors: Gerd Cornils, Merzenich; Florian Fischer, Alsdorf; Rolf Kotte, Alsdorf-Begau; Werner Siegel, Köln-Rodenki, all of Germany

[73] Assignee: Saint Gobain Vitrage International, Courbevoie, France

[21] Appl. No.: 125,902

[22] Filed: Sep. 23, 1993

[30] Foreign Application Priority Data

Sep. 29, 1992 [DE] Germany .......... 42 32 554.4

[51] Int. Cl.⁶ .................. B29C 47/02; B29C 39/10
[52] U.S. Cl. .................. 156/244.11; 156/245; 156/246; 156/107; 156/108; 264/212
[58] Field of Search ......... 156/99, 107, 108, 245, 156/246, 244.11, 242; 264/212

[56] References Cited

U.S. PATENT DOCUMENTS

| | | | |
|---|---|---|---|
| 3,416,833 | 12/1968 | Griffin | 296/93 |
| 3,476,628 | 11/1969 | Meinhardt et al. | 156/246 |
| 3,742,649 | 7/1973 | Dochnahl | 52/397 X |
| 3,762,981 | 10/1973 | Blank | 156/99 X |
| 4,139,234 | 2/1979 | Morgan | 52/208 X |
| 4,438,609 | 3/1984 | Nielson et al. | 52/208 |
| 4,530,192 | 7/1985 | Ginster | 52/397 |
| 4,581,276 | 4/1986 | Kunert et al. | 156/108 |
| 4,753,824 | 6/1988 | Toda et al. | 118/323 |
| 4,768,319 | 9/1988 | Derner | 52/208 |
| 4,839,122 | 6/1989 | Weaver | 264/135 X |
| 4,874,654 | 10/1989 | Funaki et al. | 428/34 X |
| 4,933,032 | 6/1990 | Kunert | 156/108 |
| 4,938,521 | 7/1990 | Kunert | 52/208 X |
| 4,970,102 | 11/1990 | Guillon | 296/93 X |
| 5,033,249 | 7/1991 | Scheeren et al. | 52/790 |
| 5,057,265 | 10/1991 | Kunert et al. | 264/511 |
| 5,062,248 | 11/1991 | Kunert | 52/208 |
| 5,069,012 | 12/1991 | Riederer | 52/208 |
| 5,085,021 | 2/1992 | Kunert | 52/208 |
| 5,096,255 | 3/1992 | Leischner | 52/208 X |
| 5,108,526 | 4/1992 | Cornils et al. | 156/108 |
| 5,137,323 | 8/1992 | Gross et al. | 52/208 X |
| 5,154,028 | 10/1992 | Hill et al. | 52/208 |
| 5,158,638 | 10/1992 | Osanami et al. | 156/99 X |

FOREIGN PATENT DOCUMENTS

| | | | |
|---|---|---|---|
| 0076924 | 4/1983 | European Pat. Off. | B60R 13/06 |
| 0083061 | 7/1983 | European Pat. Off. | B05B 7/16 |
| 0304694A2 | 3/1989 | European Pat. Off. | B60J 1/10 |
| 0421833 | 4/1991 | European Pat. Off. | B60J 1/02 |
| 2308457 | 8/1974 | Germany . | |
| 3323006A1 | 1/1985 | Germany | B60J 1/02 |
| 3419894A1 | 11/1985 | Germany | C03C 27/04 |
| 4100631A1 | 7/1992 | Germany | B60J 1/00 |
| 1591317 | 6/1981 | United Kingdom | B29F 3/10 |
| 2132130A | 7/1984 | United Kingdom | B29H 9/10 |

OTHER PUBLICATIONS

Japanese Patent Office, Patent Abstracts of Japan, 8 Juin 1990, vol. 14, No. 266 (M-982) (4209); JP-A-20 76 16 (Toyoda Gosei Co. Ltd.) 16 Mars 1990.

Derwent Publications Ltd., London, GB; AN 90-128279 [17]; JP-A-2 076 716 (Toyoda Gosei) 16 Mars 1990.

*Primary Examiner*—Michael W. Ball
*Assistant Examiner*—Francis J. Lorin

[57] ABSTRACT

Process for producing an automobile pane, equipped with a frame of elastomer of a predetermined shape by extruding the elastomer onto the periphery of the pane and beyond the pane and defining at least a part of the shape of the elastomer as it is extruded by positioning mold surfaces beyond the periphery of the pane.

7 Claims, 3 Drawing Sheets

PROCESS FOR THE PRODUCTION OF AN AUTOMOBILE PANE EQUIPPED WITH AN ELASTOMER FRAME OF A PREDETERMINED SHAPE

BACKGROUND OF THE INVENTION

This invention relates to a process for producing a pane equipped with a frame made of a thermoplastics polymer, in particular an automobile pane, and in which the thermoplastics polymer is discharged from an extruder and conducted by a heating pipe to a heating extrusion nozzle, itself guided by a robot, said polymer being thus deposited on the surface of the pane.

Such a process forms the subject of copending application Ser. No. 07/916,325, filed Jul. 17, 1992, now U.S. Pat. No. 5,336,349, and assigned to the same assignee as the present application. It describes the method according to which a pane which has undergone a pretreatment of its surface at the periphery, where the frame is to be deposited, is placed on a table with its face which is later to be towards the interior of the vehicle upwards. There is then deposited by extrusion, onto the upper surface of the pane at the edge, a profile, the calibrated section of which corresponds to that of the extrusion nozzle. This is such that it gives to the frame the desired cross-section. The profile deposited on the peripheral surface of the pane advantageously has an elastic lip which projects beyond the pane and will serve for centering and for sealing the pane, when it is placed in the opening of the vehicle body. The fact that the lip projects from the pane makes possible its automatic centering in the opening and the lip thus assures a constant separation between the periphery and the edge of the rebate of this opening. This elastic lip also compensates for the dimensional tolerances of the pane resulting from the various phases of its production, and in particular from the cutting and bending.

SUMMARY OF THE INVENTION

The invention has the objective of developing this process in such a way that it shall make possible the realization of panes equipped with a frame of very high dimensional accuracy, the frame furthermore enabling a perfect continuity between the pane and the bodywork to be obtained during installation.

The invention proposes a process for fitting a pane with a thermoplastic elastomeric profile by means of an extrusion head, supplied from an extruder through a pipe and guided along the periphery of the pane by a robot, the pane being placed with its surface in contact with the surface of a mould, the surface of the mould projecting beyond the pane, and the extrusion head depositing a thermoplastic elastomer cord, which projects beyond the edge of the pane and is limited by the surface of the mould.

The process of this invention enables an assembly consisting of pane plus frame to be produced, in which the frame of thermoplastic polymer increases the overall size of the pane in such a way that the external dimensions are precisely those that it is desired to obtain, independently of the tolerances proper to the pane before it is provided with its polymer frame. Furthermore, the fact that the polymer is a thermoplastics polymer offers the advantage that the transition zone between the start and the return of the extrusion nozzle at the periphery of the pane may be corrected in a simple manner by means of a heating pressing tool.

The process of this invention makes it possible to obtain henceforth, in a simple and economic manner, a pane equipped with a frame having an accuracy as high as that which is obtained by the encapsulation technique "cast in place".

In a first variant of the process, the high precision of the external periphery of the pane equipped with its frame is obtained by the use of a mould provided with a flange, the internal dimensions of which correspond to the desired external dimensions for the polymer frame.

The same result may be achieved by another variant of the process of this invention. In this variant, the exact external position of the extruded frame is obtained directly by the extrusion from the nozzle with which the head is equipped which, in the present case, moves with high accuracy along a path imposed by a robot during its displacement along the periphery of the pane.

In all cases, the use of a heated mould provides certainty that the thermoplastic polymer leaving the nozzle and coming into contact with the surface of the hot mould will not become fixed until after a certain time, which guarantees in all cases that the surface of the mould shall be completely wetted. The temperature of the mould, like the operating temperature of the polymer, must be chosen in every case as a function of the properties of the polymer used. It is necessary, in fact, that on the one hand the viscosity shall be sufficiently low during extrusion for this extrusion to be easily carried out, but from another aspect it is important that the setting of the polymer takes place sufficiently rapidly for it to be possible to remove the pane together with its frame from the mould as soon as possible after the completion of extrusion.

DETAILED DESCRIPTION OF THE INVENTION

Figure 1:
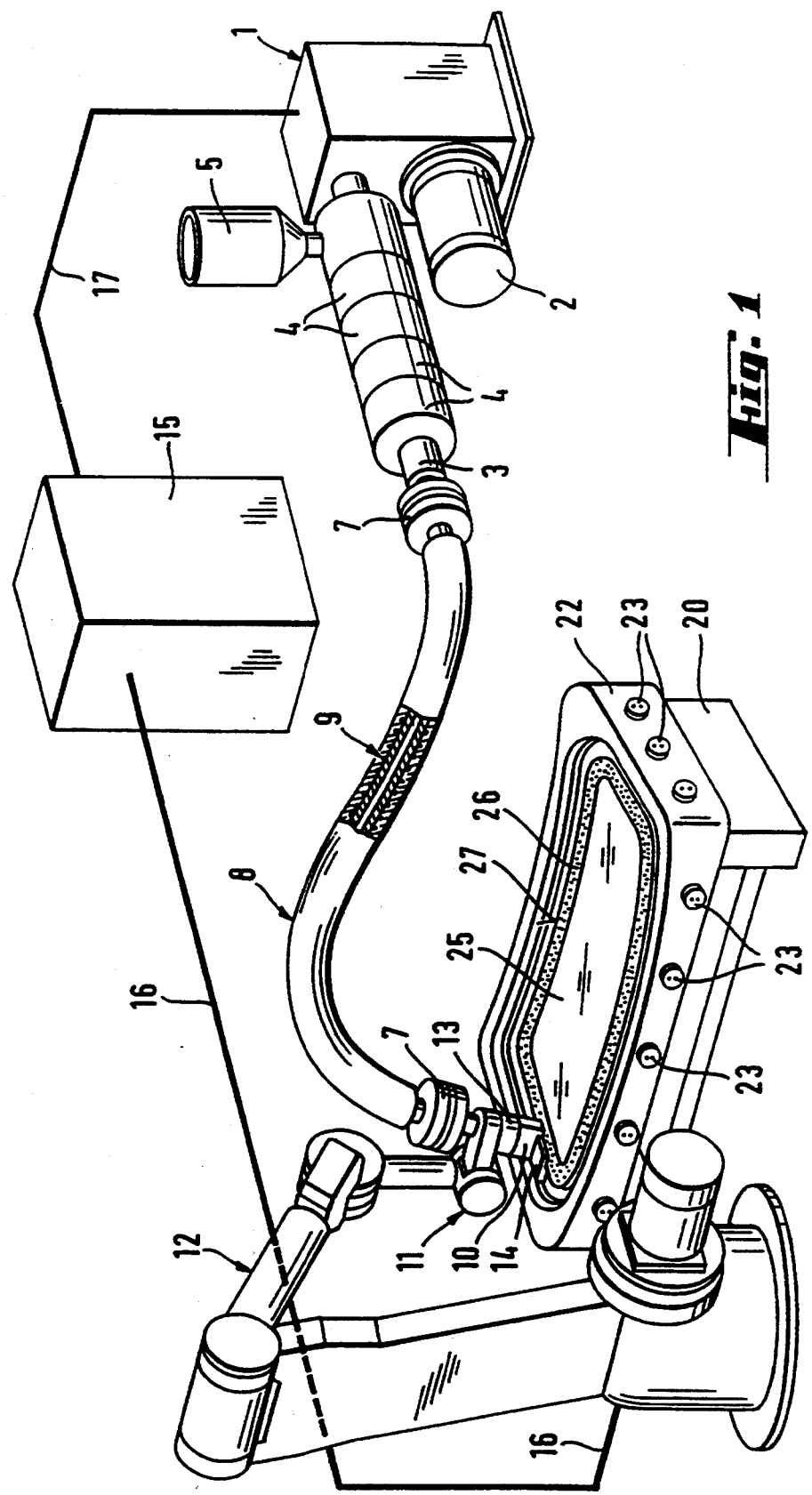
FIG. 1 is a respective view of an installation which enables the process to be carried out.

In FIG. 1 it is possible to see the various elements of the installation necessary for carrying out the invention. A screw extruder 1 is driven by a motor 2. It comprises a barrel 3, in which the screw is situated, and around it are disposed several heating rings 4. The thermoplastic polymer is introduced into the hopper 5 in the form of granules. At the outlet from the barrel 3 there is a revolving coupling 7, which is followed by a heating high-pressure pipe 8. The pipe 8 is able to withstand pressures of up to 250 bar at the operating temperature. It is provided with a heating wrapping 9 which enables the pipe 8 to be maintained at a temperature of at least 200° C. Moreover, the design of the pipe 8 and, in particular, its flexibility, should be such that it enables the extrusion head 10 freely to follow its trajectory. At the other end of the heating high-pressure pipe 8 there is a second revolving coupling 7. This prevents torsion forces from being transmitted to the pipe 8, which also limits the reaction forces on the extrusion head. In this way inaccuracies in the movement of the extrusion head are avoided.

The extrusion head 10, supplied by the heating high-pressure pipe 8 with molten elastomer, is held by the "hand" 11 of a robot 12. The extrusion head 10 is itself equipped with an electrical heating element 13. This enables the temperature of the thermoplastic material to be extruded to be maintained at the appropriate value for the extrusion to take place under good conditions. This temperature is, for example, 200° C. The extrusion head 10 enables the frame 14 to be extruded directly onto the periphery of the pane 25.

The installation comprises, in addition, a central control unit 15. This enables the robot 12 to be controlled by the lead 16 and the extruder 1 to be controlled by the lead 17.

A mould 22 of metal is mounted on a support 20 within the field of action of the "hand" of the robot 12. This mould is equipped with heating elements 23 which enable it to be heated to the desired temperature. A thermostatic control system ensures the stability of the temperature of the mould 22. The pane 25, after having been preheated, if desired, to a temperature of from 80° to 150° Celsius, is placed on the mould 22 with its concave face upwards. After any adjustment that may be necessary of the position of the pane 25 on the mould 22, it is held firmly by means of a device, not shown, such as for example a suction cup applied to the convex lower face. As soon as the pane 25 is fixed in the desired position, the extrusion head 10, held by the "hand" 11 of the robot, is moved along the periphery of the pane 25, where the combined action of the extrusion head 10 and of the mould 22 enables the polymer frame 14 to be created at the periphery of the pane 25.

The pane 25 may be equipped, for example, on its upper face with a border 26, made of an opaque colouring material fixed by baking, such as an enamel. The surface of the pane 25 or of the border 26 is carefully cleaned and treated with a suitable primer. The molten thermoplastics polymer may then be extruded.

A thermoplastics polymer which has proved suitable for use in this invention is the product Santoprene 111-64 of the company Advanced Elastomer Systems. This is an elastomer based upon polyolfin, such as isotactic polypropylene, and ethylene-propylene-diene rubber. A product of this type has a working temperature of 180° to 230° C. A primer suitable for bonding this product to glass or to an enamel border 26 is, for example, a two-component polyurethane system modified in solution in a mixture of trichloroethylene, of 1-1-1-trichloroethane and of methylene chloride. These are, for example, the products X 8310 of the Henkel Company or AK 290 of the Kömmerling Company.

As stated above, both the mould 22 and the extrusion head 10 may be designed in various ways. In FIGS. 2 to 5 there are shown different forms of construction which all enable the process according to this invention to be realized.

Figure 2:
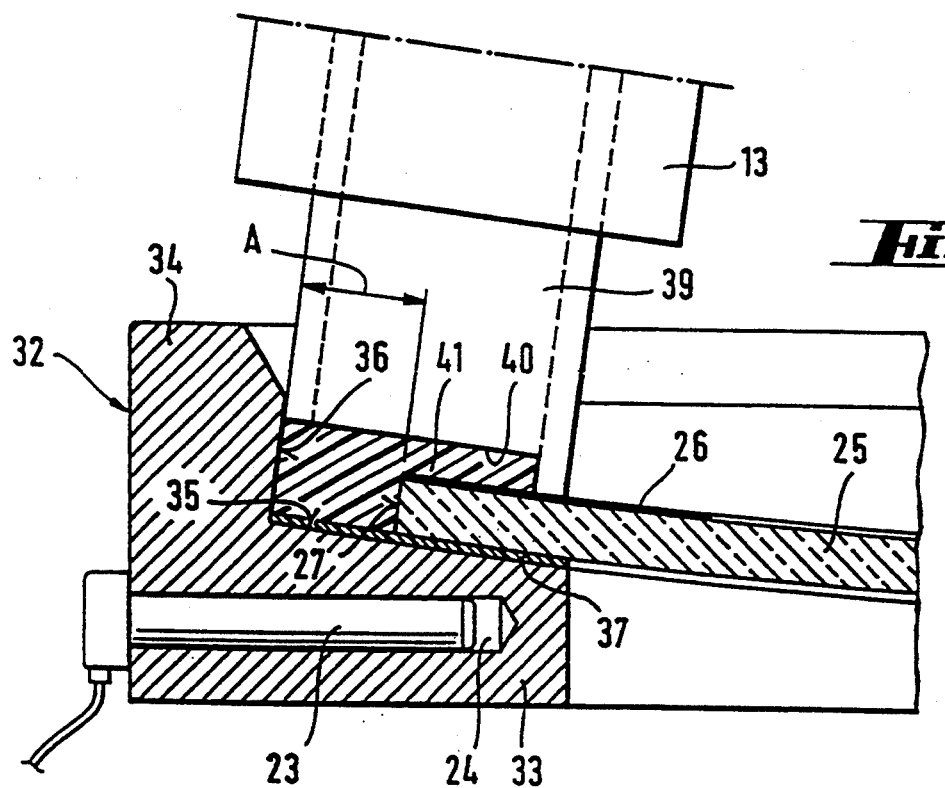
FIG. 2 is a partial cross-sectional view of a mould with a flange and also an extrusion head in the simplest variant.

The form of embodiment of the device in FIG. 2 shows a mould 32 which encases the pane. It is formed of a lower part 33 having a peripheral flange 34. The lower part 33 has a support surface 35, capable of hugging the lower face of the pane 25. The mould part 33, however, projects laterally beyond the edge 27 of the pane 25 by the distance A. Laterally, the surface 35 of the lower part 33 is limited at the outside by the inside peripheral surface 36 of the flange 34. The internal dimensions of the mould, that is to say the contour defined by the surface 36, correspond to the external contour of the pane 25 equipped with its polymer frame.

The mould 32 is of metal, for example an aluminum alloy. Onto its surface 35 there has been deposited a layer 37, made of an elastic material capable of adapting so as to absorb the tolerances of the pane 25 perpendicularly to its surface. The mould is provided with a series of holes 24, into which the electrical heating elements 23 are introduced.

The extrusion head 39 comprises a nozzle 40, the upper boundary of which is rectilinear. This extrusion head is displaced by the robot above the pane 25 along the internal surface 36 of the peripheral flange of the mould. During this displacement, a polymer cord 41 is deposited at the periphery of the pane 25. This cord occupies the entire space left free between the edge face 27 of the pane 25, the upper face of the layer 37 and the internal surface 36 of the peripheral flange 34. In addition, it is limited in its upper part by a flat zone above the pane 25. After setting, the polymer cord 41 adheres firmly to the surface of the pane, around which it constitutes the desired frame.

Figure 3:
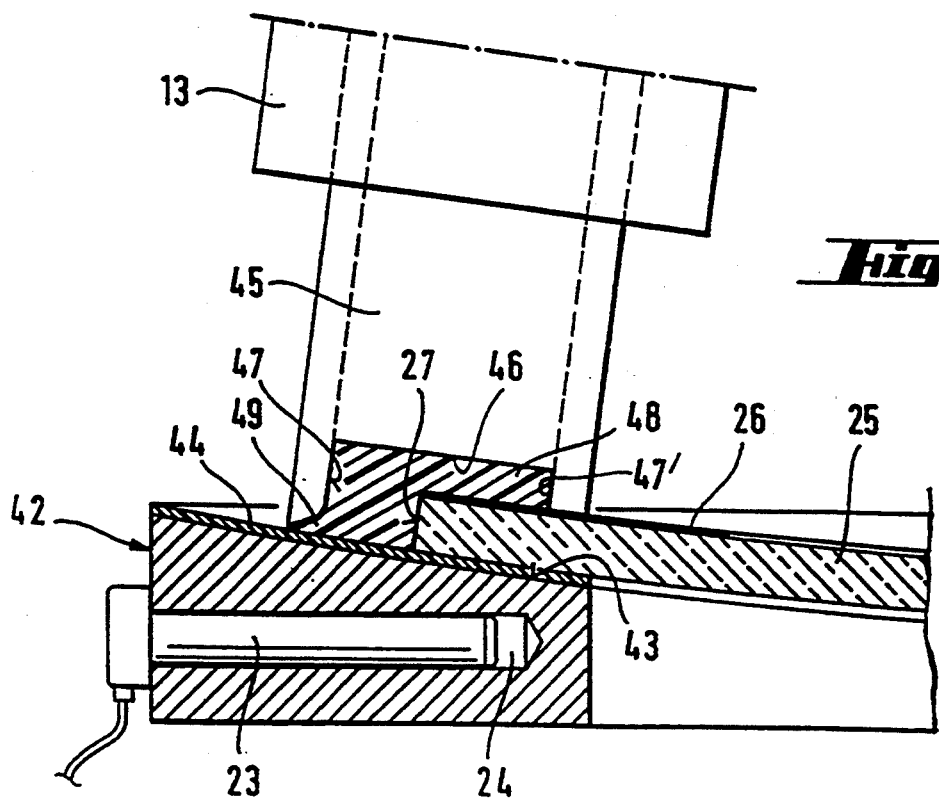
FIG. 3 is a partial cross-sectional view of a mould without a flange and an extrusion head with, in this case, an adapted calibrated nozzle.

In FIG. 3 there is shown an example of embodiment, in which the mould 42 does not have a peripheral flange. The mould is constituted exclusively of a frame-shaped lower part, the upper support surface 43 of which corresponds basically to the lower surface of the pane 25. Here again, a layer 44 of an elastic material capable of absorbing the tolerances of the pane has been provided on the metal surface 43. The extrusion head 45 possesses a calibrated nozzle 46 having, in this case, lateral wall portions 47 and 47' as well. The wall 47 has a shape such that it is capable of creating, along the whole outer length of the polymer cord 48, an excrescence or bulge 49 which has the shape of a lip. The wall 47', on the other hand, defines the inner boundary of the cord as in the embodiment of FIG. 2.

In the case of FIG. 3, it is solely the guidance of the extrusion head by means of the robot, controlled by the control center, along a defined trajectory that determines the external shape of the frame. This guidance must therefore be carried out with very great care.

Figure 4:
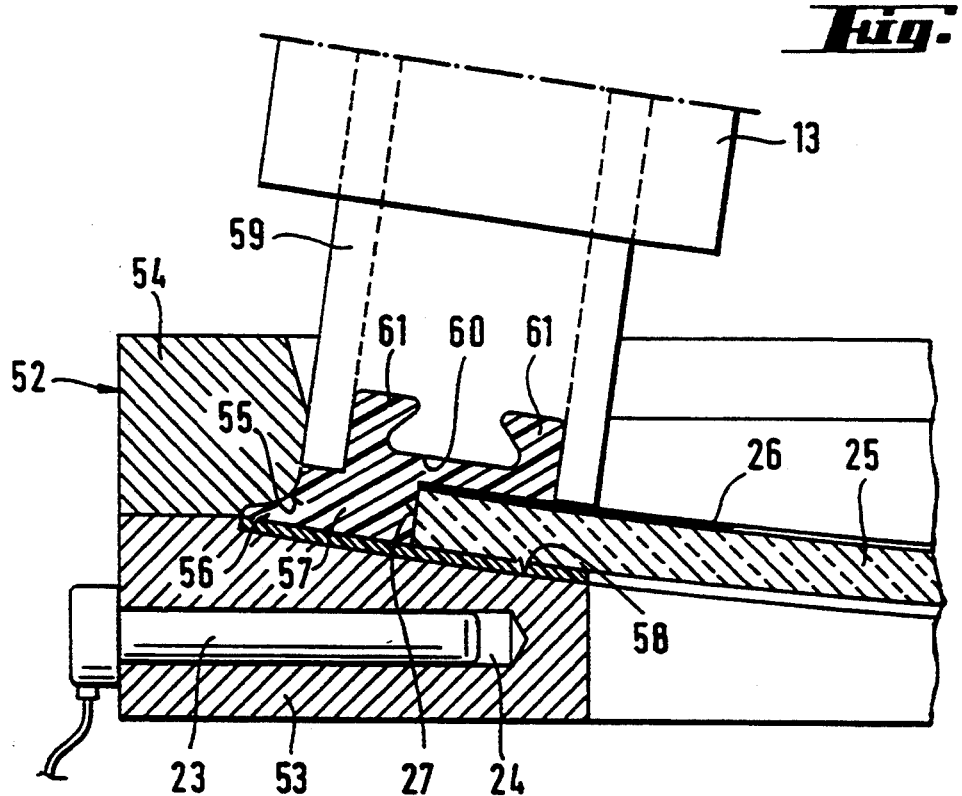
FIG. 4 is a partial cross-sectional view of a two-part mould with an extrusion head, which comprises a nozzle for producing a profile, the cross-section of which has a hollow.

FIG. 4 shows a form of embodiment of the invention, in which the mould 52 is in two parts, a lower mould 53 and an upper mould 54. The upper mould 54 includes a lower face 55 which limits the upper part of the elastomer frame and enables the excrescence or bulge 56 in the form of a lip to be produced as a result of the profile of the upper mould 54. In contrast, the lower mould 53 forms the continuation of the surface of the pane as it is formed by the upper support surface 58 of the lower mould 53. Furthermore, the extrusion head 59 has an extrusion nozzle 60, the shape of which is such that the extruded cord 57 comprises a channel bounded by two banks 61. The section of this profile enables a pane to be provided which is capable of being dismantled by means of a cord of adhesive intended for bonding to the metal plating and which, during placing, will have filled the channel provided in the frame without adhering to it.

In the case of FIG. 4, the extrusion head 59 may either be guided by the robot according to a pre-established programme along the periphery of the pane 25, or this same extrusion head may run along the upper mould 54; in the latter case, the extrusion head should be mounted in flexible manner in the "hand" of the robot, and then the guidance of the extrusion head does not need to be as accurate as in the first method.

Figure 5:
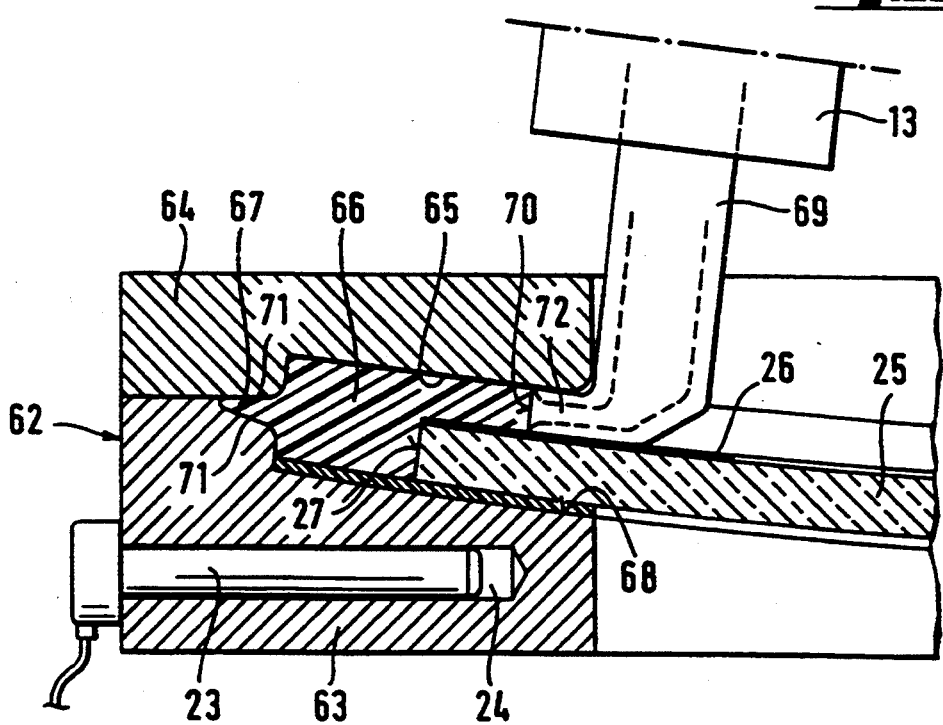
FIG. 5 is a partial cross-sectional view of a two-part mould, in which the upper mould is closed with, in the present case, a special injection nozzle.

The most developed system of this invention is shown in FIG. 5. Here again the mould 62 comprises two parts, a lower part 63 and an upper part 64, but as a difference from the preceding systems, in the present case the mould 64 extends above the pane 25 and comprises a lower face 65 which will serve for limiting the upper part of the elastomer frame. With regard to the lower mould 63, it possesses an upper support surface 68 in continuation of the lower surface of the pane 25. The lower mould 63 and the upper mould 64 comprise, in addition, surfaces 71 intended for forming the boundaries of the lip-shaped bulge 67, which extends beyond the elastomer frame. The only external surface of the profile which is created by the extrusion nozzle itself is its internal surface 70, the other surfaces being themselves created by the lower mould and the upper mould. The extrusion head 69 has a right-angled outlet end 72 so shaped as to allow it to be introduced between the pane and the lower face 65 of the upper mould 64. In this case also it is possible to displace the extrusion head with large tolerances, in view of the fact that all the external surfaces of the profiled frame are created by the two parts of the mould 62.

We claim:

1. Process for equipping a pane (25), having first and second opposite surfaces, with a profiled member of thermoplastic elastomer by means of an extrusion head (10, 39, 45, 59, 69) supplied from an extruder (1) by a pipe (8) and guided along an edge face (27) of the pane, defining the periphery of the pane (25), by a robot (12), the process comprising the steps of:
    (a) placing the pane (25) in a mould (22, 32, 42, 52, 62) with the first surface in contact with a support surface (35, 43, 58, 68) of the mould, with the support surface projecting beyond the edge face (27) of the pane;
    (b) depositing a cord of thermoplastic elastomer (41, 46, 60, 66) from the extrusion head (10, 39, 45, 59, 64) onto said second surface of the pane at the periphery of the pane and onto the support surface which projects beyond the edge face (27) of the pane (25);
    (c) adhering the cord of thermoplastic elastomer to said second surface; and
    (d) removing said pane with said cord adhered thereto from said mould.

2. Process according to claim 1 wherein the mould (22, 32, 52, 62) has an inside peripheral surface (36, 55, 71); and the process further includes the steps of:
    (a) placing the pane (25) on the support surface (35, 58, 68) of the mould (22, 32, 52, 62) with the edge face (27) of the pane spaced from said inside peripheral surface (36, 55, 71) of the mould; and
    (b) depositing said cord of thermoplastic elastomer onto said support surface of the mould to fill the space between said edge face of the pane and said peripheral surface of said mold.

3. Process according to claim 1 wherein the extrusion head (45) includes a nozzle (46) having a lateral wall portion (47); and the process further includes the steps of:
    (a) placing said lateral wall portion (47) of the extrusion head at a laterally spaced position relative to the edge face (27) of the pane as the extrusion head is guided along said edge face; and
    (b) depositing said cord of thermoplastic elastomer into said support surface (43) of the mould (42) to fill the space between said edge face of the pane and said lateral wall portion of the extrusion head.

4. Process according to claim 1, further comprising the steps of:
    (a) absorbing any irregularities in the first surface of the pane (25) by placing a layer (37, 44) of plastic material on the support surface (35, 43, 58, 68) of the mould; and
    (b) placing the first surface of the pane on said layer when placing the pane in said mould.

5. Process according to claim 1 wherein, a thermoplastic elastomer based upon a polyolefin, including isotactic polypropylene, and ethylene-propylene-diene rubber is used as the elastomer.

6. Process according to claim 1 further comprising the step of:
    heating the pane (25) to a temperature of from about 80° to 150° C. before depositing the elastomer cord.

7. Process according to claim 6, further comprising the step of:
    heating the mould (22, 32, 42, 52, 62) during the depositing of the elastomer to a temperature sufficient to permit flow of said elastomer in said space defined outwardly of said edge face of the pane so as to completely fill said space.

* * * * *